United States Patent [19]

Brasoveanu et al.

[11] Patent Number: 5,335,017
[45] Date of Patent: Aug. 2, 1994

[54] METHOD FOR ENCODING TRANSMITTING AND RECEIVING HIGH DEFINITION TELEVISION SIGNALS USING SINGLE VARIABLE INDEPENDENT EQUATIONS REPRESENTING EACH PIXEL OVER TIME

[75] Inventors: Dan Brasoveanu, 4603 Virginia Ave., Baltimore, Md. 21225; Mihai C. Rauta, Rockville, Md.

[73] Assignees: Scott C. Harris; Dan Brasoveanu; M. Rauta, Washington, D.C.

[21] Appl. No.: 2,278

[22] Filed: Jan. 8, 1993

[51] Int. Cl.$^5$ ............................................... H04N 7/12
[52] U.S. Cl. ..................................... 348/426; 348/384
[58] Field of Search ................ 358/136, 135, 160, 141; H04N 7/12, 7/133, 7/135, 7/137

[56] References Cited

U.S. PATENT DOCUMENTS

| | | | |
|---|---|---|---|
| 4,330,833 | 5/1982 | Prat et al. | 364/515 |
| 4,704,628 | 11/1987 | Chen et al. | 358/136 |
| 4,890,160 | 12/1989 | Thomas | 358/105 |
| 5,093,720 | 3/1992 | Krause et al. | 358/133 |
| 5,113,256 | 5/1992 | Citta et al. | 358/133 |
| 5,148,274 | 9/1992 | Knauer et al. | 358/141 |

FOREIGN PATENT DOCUMENTS

| | | | |
|---|---|---|---|
| 0221743 | 5/1987 | European Pat. Off. | H04N 7/12 |
| 0349847 | 1/1990 | European Pat. Off. | H04N 7/133 |
| 0467054 | 1/1992 | European Pat. Off. | H04N 7/133 |

Primary Examiner—Victor R. Kostak
Assistant Examiner—Nathan J. Flynn
Attorney, Agent, or Firm—Scott C. Harris

[57] ABSTRACT

A high definition television system. Each pixel of the resulting television picture is represented by three equations which describe that pixel state over a predetermined time. Only coefficients of those equations need to be transmitted. Only those pixels which have an equation which completely changes need to be transmitted. Hence, at any given time, only a very small percentage of information needs to be transmitted: the rest of it follows the pre-sent coefficients.

9 Claims, 5 Drawing Sheets

METHOD FOR ENCODING TRANSMITTING AND RECEIVING HIGH DEFINITION TELEVISION SIGNALS USING SINGLE VARIABLE INDEPENDENT EQUATIONS REPRESENTING EACH PIXEL OVER TIME

BACKGROUND AND SUMMARY OF THE INVENTION

Television images are composed of picture elements (pixels). Conventional television systems have about 400 rows by 600 columns of pixels. More generally, HDTV systems proposed to date may have $1100 \times 1100$, or even more pixels arranged in the same manner.

To reconstruct an image using conventional techniques, n by m "packets" of data, one for each pixel, must be transmitted. Each data "packet" includes:

1) The black and white ("BW") information—the gray nuance (or luminance)
2) The color systems information—the intensity of each fundamental color, usually the triplet red, blue, and green. This is usually encoded as luminance and chrominance signals (Y,P & Q) using the present National Television Systems Committee ("NTSC").

To date all television ("TV") and TV-related systems convey the information needed to reconstruct the image, including the luminance for black and white information and the intensity of the fundamental colors for color applications, by conveying their values at the present time—in effect a tabular representation. Some proposed HDTV digital techniques determine pixel color intensities based on other pixel states. This is not done solely as a function of time.

The present invention discards this established teaching, and instead expresses the black and white ("BW") or color information regarding a particular pixel as functions of time. Each function is described by a set of coefficients. This set is transmitted only for the areas which need update. The same function holds for a large number of scans and hence no update of this information is required for long periods of time. Chrominance and luminance information for any pixel is reconstructed by independent calculations. Only limited image areas are likely to require data updating at any given time, therefore, representing the colors of each pixel as mathematical expression considerably decreases the volume of data transmitted to attain a given picture quality level. The main obstacle preventing large-scale HDTV implementation has been the limited bandwidth allotted to each TV channel: hence the present invention would considerably facilitate HDTV implementation.

Example of mathematical expression representing $g(x)$ as a function of $x$.

$$g(x) = 12x + 1 \quad (1)$$

Example of tabular representation of the same function

TABLE 1

| x | g(x) |
|---|------|
| 0.1 | 2.2 |
| 0.2 | 3.4 |
| 0.3 | 4.6 |
| 0.4 | 5.8 |
| etc. | |

The following notation will be used subsequently:
k—row index.
l—column index.
m—total nr of rows
n—total nr of columns
$p_{kl}$—the pixel located at the intersection of column k and row l.

$i^{(j)}{}_{kl}(t_f)$—the intensities of pixel p fundamental colors or simply "colors" from now on, at time $t_f$. Usually $j=1,2,3$. For BW applications, let $j=1$. Alternatively $i^{(j)}{}_{kl}$ can be its luminance (Y) and chrominance (P and Q).

$g^{(j)}{}_{kl}(t)$—the mathematical expression used to represent the color intensities of a given pixel (Y, P, and Q signals) as functions of time.

$h^{(j)}{}_{kl}(f)$—the mathematical expression used to represent the color intensities of a given pixel (possibly as Y, P and Q signals) as functions of the frame number.

tr—the relative time used for the current mathematical representation
$t_f$—the time when the f-th frame is transmitted.
f—the frame number.
df—relative frame number, i.e., nr of frames elapsed since the last color function(s) update.

Conventional TV systems update the entire image about 30 times per second. Therefore, for each pixel, they transmit $$i^{(j)}{}_{kl}(t_f), j = 1, 2, 3.$$

If r is the number of frames transmitted per second then $t_f = f/r$ and $g^{(j)}{}_{kl}(t_f)$ is the numerical value of $g^{(j)}{}_{kl}(t)$ at time $t = t_f$.

The total number of values to be transmitted per frame using conventional TV systems is:

$$D_1 = \sum_{k=1}^{m} \sum_{l=1}^{n} \sum_{j=1}^{3} i^{(j)}_{kl}(t_f) \quad (2)$$

where $i^{(1)}$ may represent the luminance, $i^{(2)}$ and $i^{(3)}$ may represent the chrominance, or $i^{(1)}$, $i^{(2)}$, and $i^{(3)}$ may represent the colors themselves.

A second method proposed for use with HDTV would transmit only the information regarding moving objects. For such systems the total number of values to be transmitted per frame would be:

$$D_2 = \sum_{p=1}^{P_{max}} \sum_{k=k_p}^{b_p} \sum_{l=l_p}^{a_p} \sum_{j=1}^{3} i^{(j)}_{kl}(t_f) \quad (3)$$

where $P_{max}$ is the number of moving objects and $b_p$, $a_p$, $k_p$, and $l_p$ are parameters defining the moving object areas.

Figure 1:
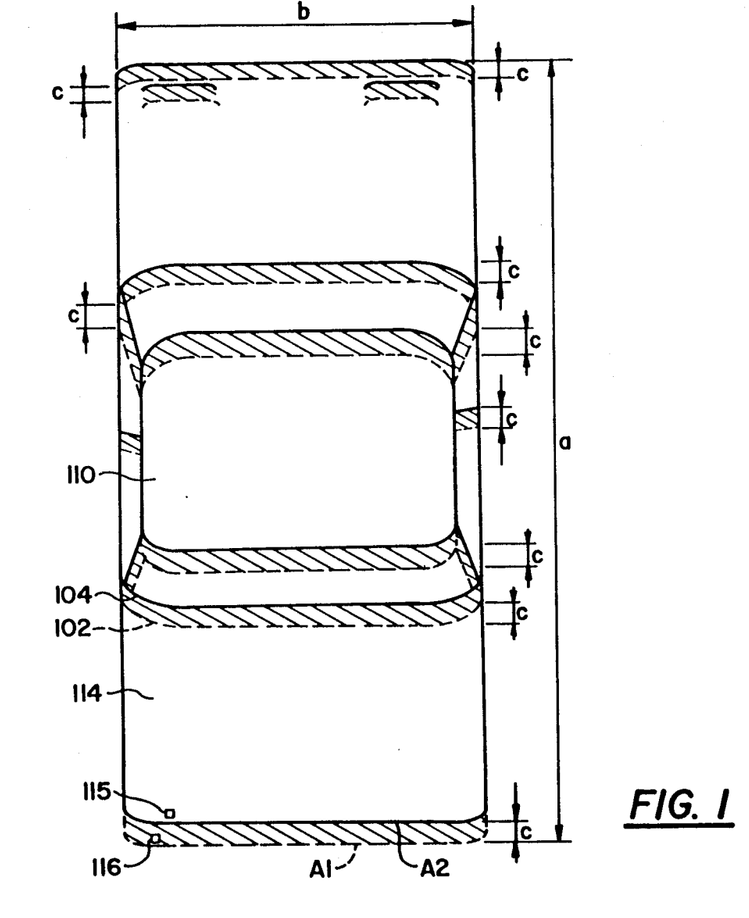
FIG. 1: Moving object represented as a group of areas surrounded by contours.

FIG. 1 shows display 100 including an aerial view of a car moving along a highway which is at point 102 at time t. At time t2 the car is at point 104. Using conventional TV systems, each frame requires the retransmission of the entire picture. The second method proposed for HDTV systems updates only the $a \times b$ area. The present invention updates only those areas were a discontinuity in luminance or chrominance occurs—here the areas of width c. In rest, the luminance and chrominance are continuous hence the previously-used equations still hold. Usually the changes occupy much less data than the whole image, except when almost the whole image consists of moving objects or all of it is in motion due to a camera sweep. In these cases, they are roughly equal and the data rate jumps to dangerously high levels (levels which may exceed the maximum allotted per channel).

According to the prior art, the number of frames displayed per second is fixed (about 30). Also according to the prior art, the number of columns and rows is fixed.

Figure 2:
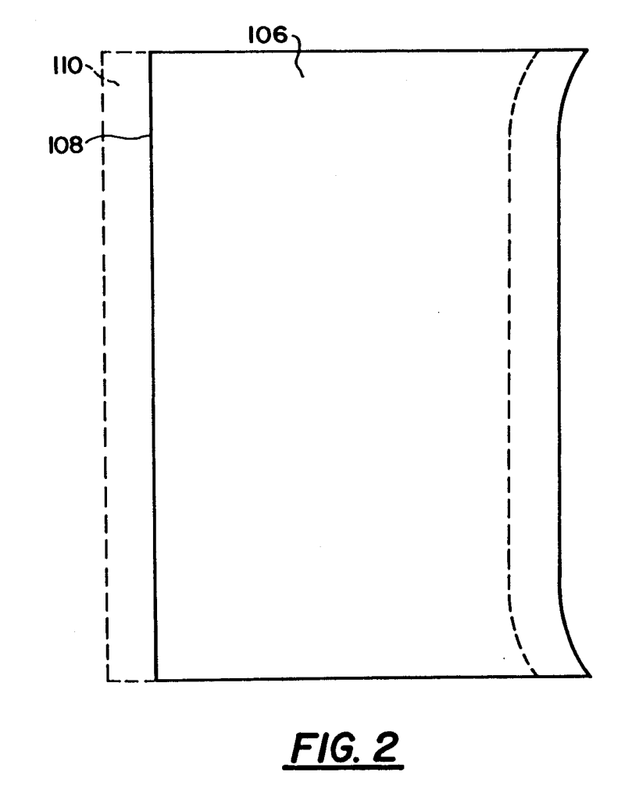
FIG. 2: Detail of FIG. 1, showing the image zones that must be updated.
Figure 3:
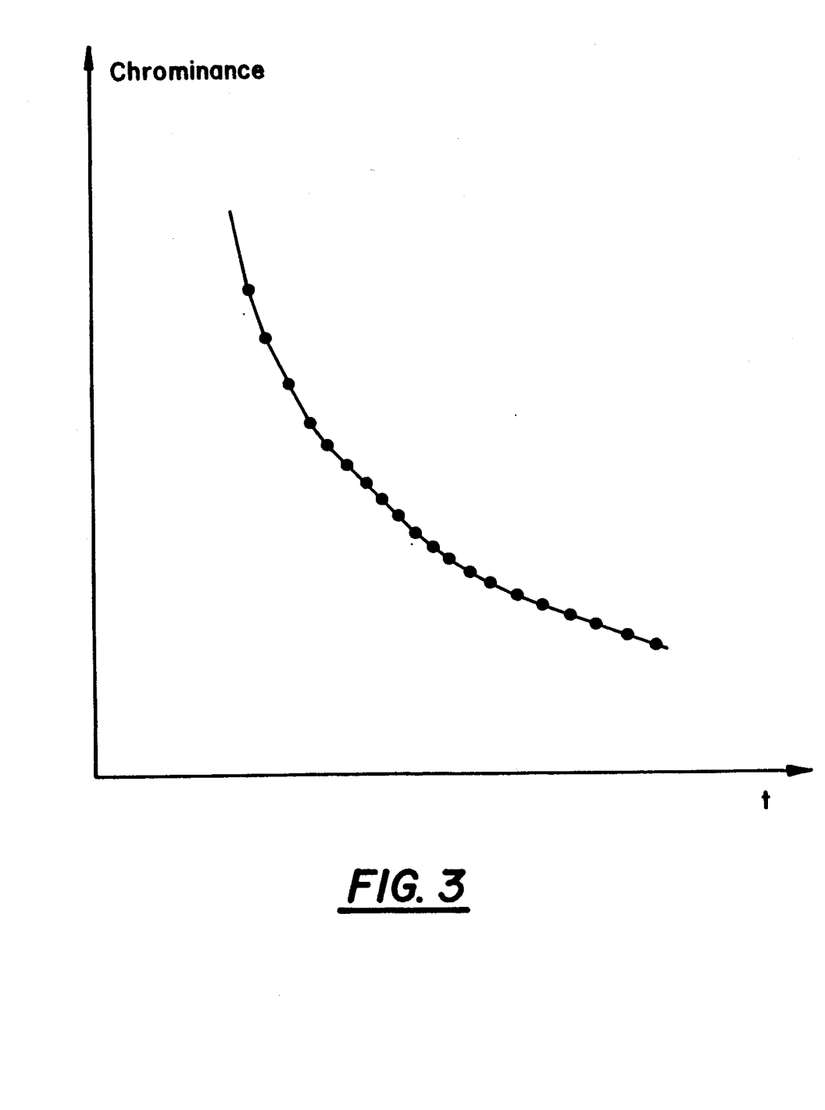
FIG. 3: Color signal variation in time

A moving object can be treated as being composed of areas bordered by contours, said areas having colors varying continuously along any direction until a contour is reached. FIG. 2 is a detail showing such an area 106 and its bordering first contour 108, as well as second area 110 at time t2. FIG. 3 shows its j-th color intensity variation along the x-direction. Since area #1 is in continuous motion, the pixel $p_{kl}$ colors can be expressed as a continuous functions of time until the contour crosses the pixel. During this interval (that can cover many frames), the pixel color intensities can be calculated by the receiver based solely on previously transmitted mathematical expressions representing the pixel color intensities. For example, in FIG. 1, only the pixels located in the hatched areas require updates. By comparison, even the most advanced systems to date update the whole a×b area. Except for the hatched areas, the invention reconstructs the image using a set of mathematical expressions:

$$g^{(j)}_{kl}(t)$$

defined so that $g^{(j)}_{kl}(tf) = i^{(j)}_{kl}(tf)$ within a given tolerance, for any given color index j or frame number f.

The $g^{(j)}_{kl}(t)$ set of equations are transmitted earlier and ideally can be used until a contour crosses the pixel. This crossing translates into a discontinuity in one or several color intensities. Then the $g^{(j)}_{kl}(t)$ set of equations will need to be updated.

If a sophisticated representation is used, the $g^{(j)}_{kl}(t)$ set of equations can be used for an extended period of time, but more data is required to define it. A simple form requires less data to be defined but has to be updated more frequently. An optimum format has to be used, so that the data flow is kept to a minimum. The proposed method allows an increased and variable number of frames displayed per second. The proposed method allows the concomitant use of various numbers of columns and rows.

BRIEF DESCRIPTION OF THE DRAWINGS

These and other aspects of the invention will now be described in detail with reference to the accompanying drawings, wherein.

DESCRIPTION OF THE PREFERRED EMBODIMENTS

A brief description of the concept used by the present invention to operate will now be provided, with reference to FIG. 1. FIG. 1 shows an object 110 which is generally moving. The object begins with its rear-most portion at position A1, and ends with its rear-most portion at its position A2. The object shown is an automobile. Hence, the positions of its windshield and the like are also shown in FIG. 1.

The hatched areas in FIG. 1 contain the pixels whose colors experience a discontinuity during the movement. The pixels located outside the hatched areas, such as the area 114, do not experience such color changes. Assuming we have a red car, the portion 114 stays red throughout the entire movement shown in FIG. 1. The precise shade of red may change due to shadowing and the like, but the overall function—red—stays the same. The preferred embodiments of this invention looks at each pixel, for example, pixel 115. Pixel 115 is investigated for a predetermined time, which for example will be taken as 20 scans. The chrominance variation over that interval is investigated and plotted as a function of time, see FIG. 3.

The limited function in FIG. 3 is then fit using a standard curve fitting algorithm to an equation of the form:

$$\text{Chrominance} = a + bt + ct^2 \ (\%)$$

This function holds over the predetermined time plotted in FIG. 3, and may very well hold for a relatively long time thereafter. the time period shown in FIG. 1—its luminance and chrominance values can be calculated at the time of each frame using the previously transmitted set of equations.

In contrast, assume that the background area 120 is gray. In this case, as the automobile 110 moves, the area between a1 and a2 changes from red to gray. This is more than just a change in the shade of red—this is an entirely new color, requiring an entirely new set of color functions. Hence, all pixels located in the area between a1 and a2, in the width b, require new color functions to be determined and transmitted.

Hence, for any pixel 116, located in the above mentioned area, a packet of data is sent updating the color functions. Assuming that the pixel 116 is at the location $k = k_{116}, \ l = l_{116}$ the packet sent has the form:

$$[k_{116}, l_{116}, j, a, b, c, j', a', b', c', j'', a'', b'', c'']$$

The first two values indicate the pixel position (its row and its column number), the third value is the index of the first color function to be updated, a, b, c are the coefficients defining the new j-th color function; if more than one color function require an update more color data sets follow.

Figure 4:
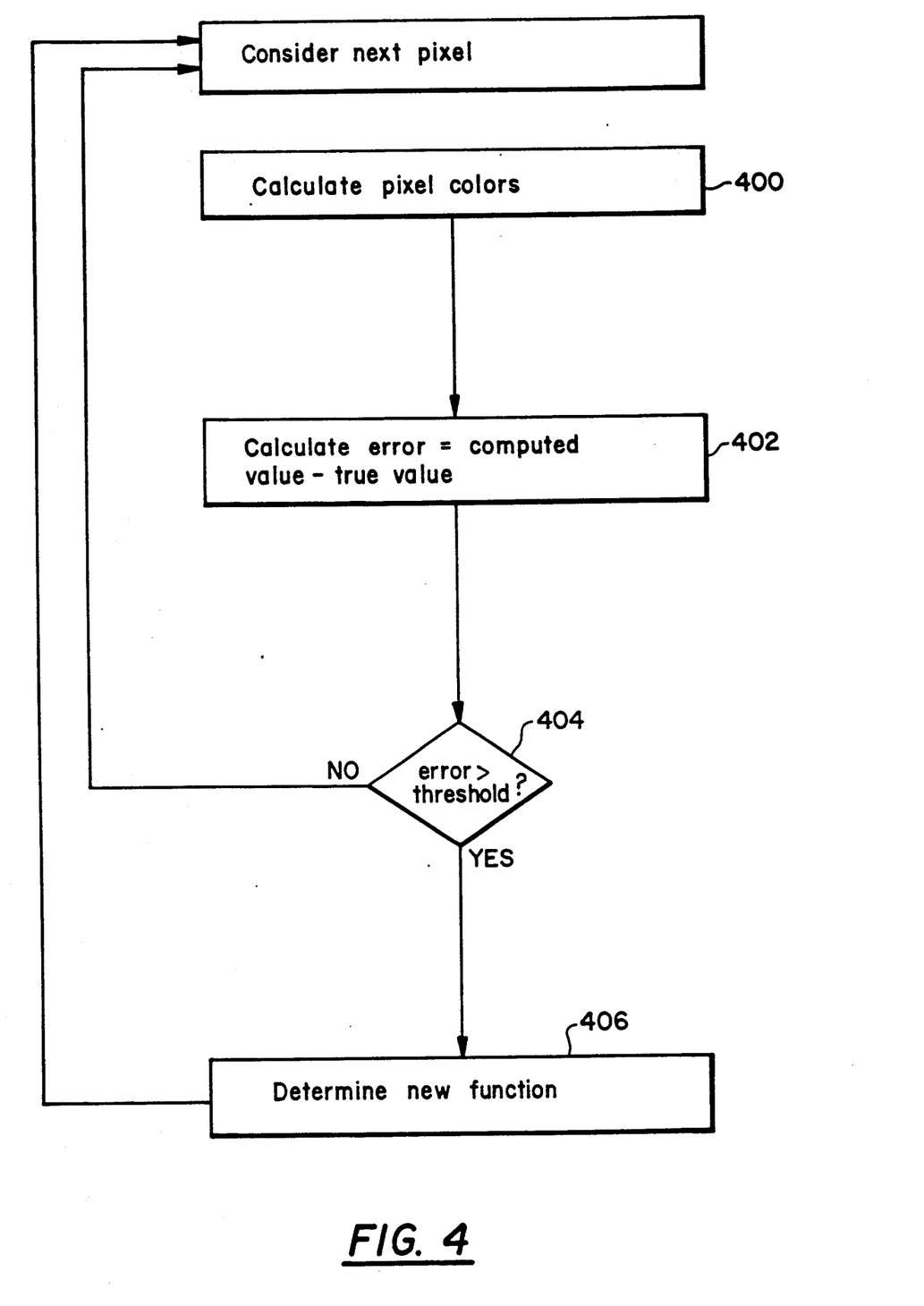
FIG. 4: Broadcast computation flow-chart

The new function(s) test routine is shown in flow chart form in FIG. 4, and it includes the most important calculations performed by the broadcast station computer. At step 400, the particular pixel color value is calculated. Then it is compared against the real value at step 402. Step 404 determines whether the error is greater than the threshold value. If the error exceeds the threshold, a new set of color functions is determined at step 406. Then the pixel index is incremented at step 408 and the routine returns to step 400.

The above procedure will be now described in more detail. The present invention operates by defining each signal describing the state of a given pixel as a mathematical function of time only. The preferred set of mathematical functions representing the pixel colors is:

$$h(f) = a^{(J)}_{kl} + b^{(J)}_{kl}(df) + C^{(j)}_{kl}(df)^2$$

where
$a^{(j)}_{kl}$, $b^{(j)}_{kl}$, and $c^{(j)}_{kl}$ are coefficients used while
$t_f < t < t_{fl}$, $t_f$ and $t_{fl}$ are successive color function update times.

A batch of 11 successive frames, the first one having the number f0 and therefore a relative frame number df=0, is used to determine the color function.

The analyzer determines the a, b, and c coefficients (to simplify the notation the j superscript and the k and l subscripts will no longer be listed), by solving the following set of equations:

$$a = i$$

$$a + 5b + 25c = i'$$

$$a + 10b + 100c = i''$$

where, $$i = i(t_f)$$

$$i' = i(t_f + 5)$$

$$i'' = i(t_f + 10)$$

This system of three equations are three unknowns can be solved as follows:

$$\Delta = \begin{vmatrix} 1 & 0 & 0 \\ 1 & 5 & 25 \\ 1 & 10 & 100 \end{vmatrix}$$

$$\Delta 1 = \begin{vmatrix} i & 0 & 0 \\ i' & 5 & 25 \\ i'' & 10 & 100 \end{vmatrix}$$

$$\Delta 2 = \begin{vmatrix} 1 & i & 0 \\ 1 & i' & 25 \\ 1 & i'' & 100 \end{vmatrix}$$

$$\Delta 3 = \begin{vmatrix} 1 & 0 & i \\ 1 & 5 & i' \\ 1 & 10 & i'' \end{vmatrix}$$

$$a = \Delta 1/\Delta$$
$$b = \Delta 2/\Delta$$
$$c = \Delta 3/\Delta$$

A set of three coefficients is required for each color signal. The error threshold can be set at 3% assuring a good compromise between picture fidelity and the need to reduce the color function updates frequency.

The broadcast station and the receiver may use different picture formats, i.e., number of rows and columns. Hence, the emitted signal can be used by several generations of HDTV receivers and future picture quality improvements will not require a new standard.

The conversion from the broadcast station format to the receiver format is performed as follows:

$$k_{re} = k_b * m_{re}/m_b$$

$$l_{re} = l_b * n_{re}/n_b$$

where,
the subscript re stands for receiver
the subscript b stands for broadcast station
m is the total number of rows
n is the total number of columns The error due to this conversion is equivalent to a pixel location shift of half the distance between two neighboring pixels or less, and therefore, it is negligible.

Figure 5:
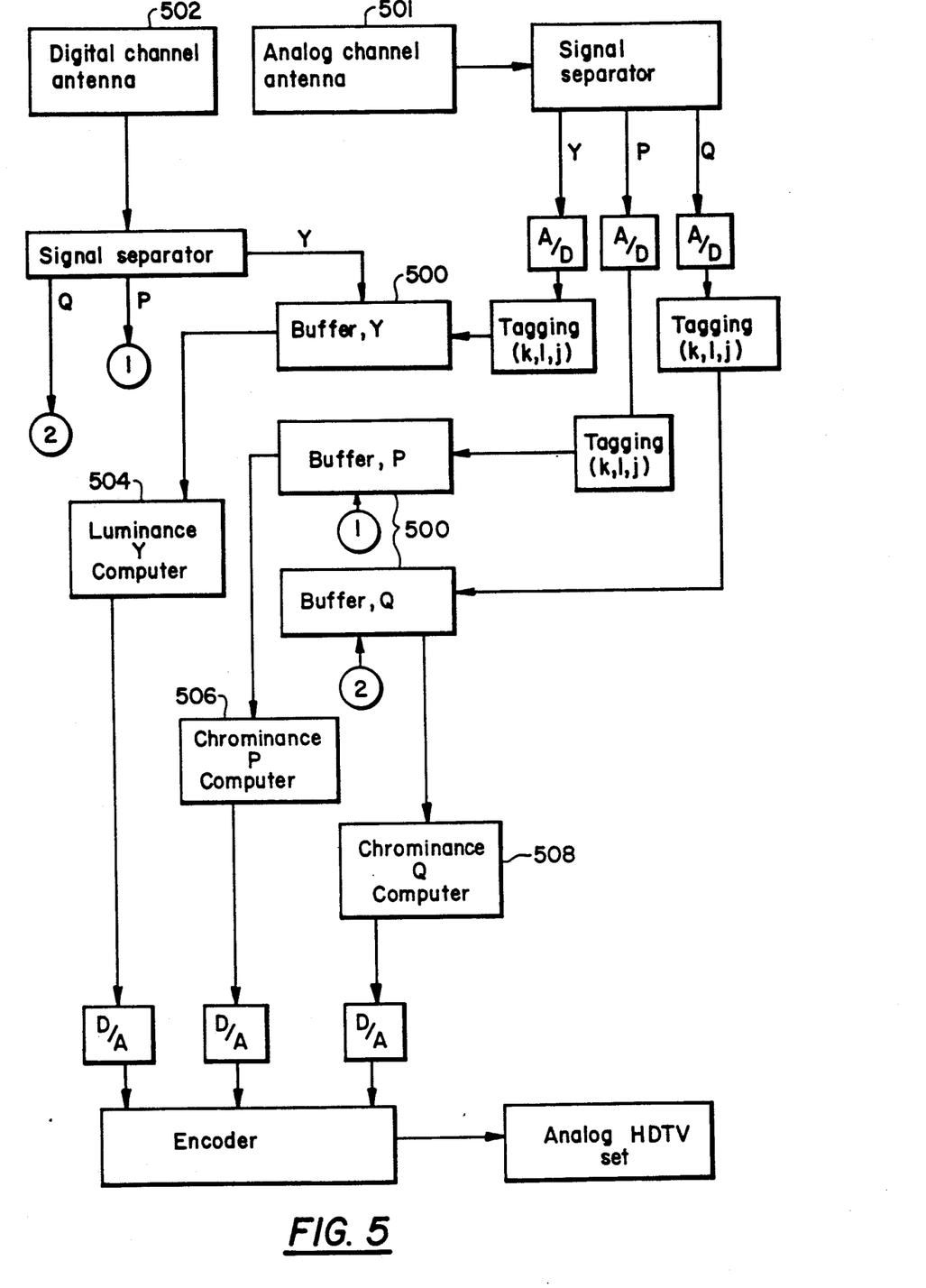
FIG. 5: Image taking system components
Figure 7:
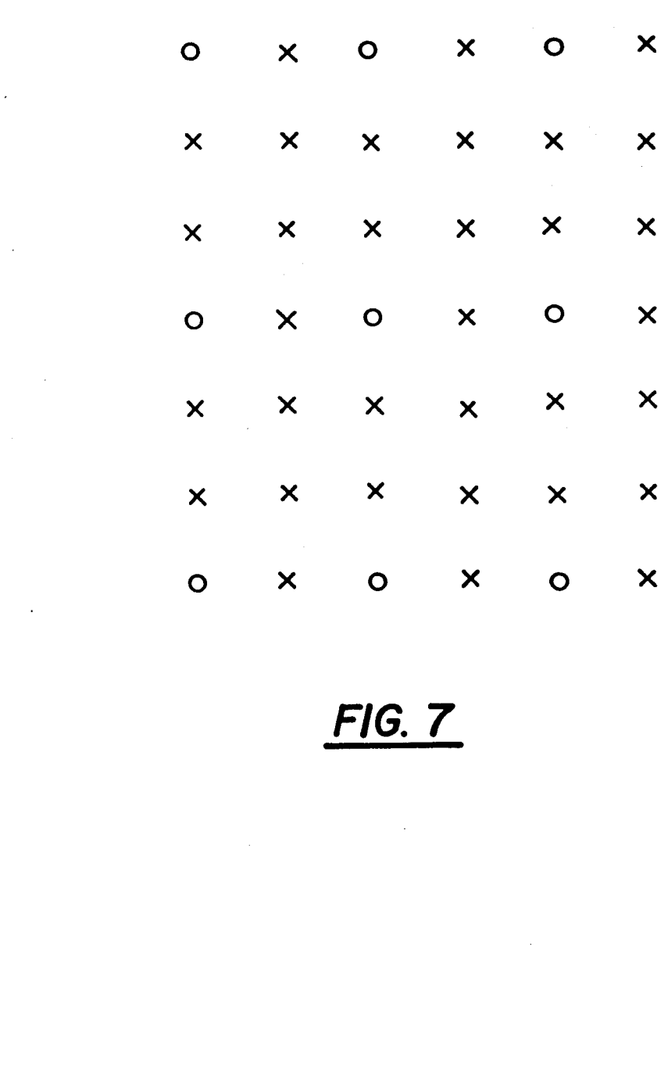
FIG. 7: Image Taking system components.

FIG. 5 is a block diagram representation of the receiver electronics. For backward compatibility with present day analog TV sets, the signals are transmitted through two channels: an analog (501) and a digital one (502). Each channel provides information for a separate grid of pixels. The two grids are intermeshed as shown in FIG. 7. The pixels marked "o" will use the current NTSC format, the pixels marked "x" will use digital encoded information. Thus present-day TV systems would read only the analog channel and perform as usual, whereas HDTV systems would read both channels to achieve a higher quality picture. The receiver stores the new color function coefficients in buffer 500. At time $t_f$ the receiver performs the conversion from the broadcast station format to the receiver format, calculates the relative frame number, luminance and chrominance for each pixel using the luminance computer 504 and chrominance computers 506 and 508. For a smoother movement rendition, the calculations can be repeated for intermediate times between successive broadcast frame times. In this manner, intermediate frames can be displayed, the number of frames displayed per second may exceed by far the current value of 30, the number not being limited by some arbitrary standard constraints. The number of frames displayed per second will be limited only by the receiver computer capabilities and can be increased as the state of the art progresses. The luminance and chrominance signals are converted from digital to analog representations and then displayed.

The embodiment preferably uses parallel data processing as shown in FIG. 5. The number of integer arithmetic calculations per second required by the preferred embodiment using a 1st generation console format of 1200 rows by 1200 columns is of the order of 1 billion if no intermediate frames are displayed, and about (M+1) * 1 billion if M intermediate frames are used.

The Intel Risc i860XP microprocessor has a speed of about 100 MFLOPS, or up to about 200 million integer arithmetic operations per second. Using no intermediate frames, six such microprocessors would be sufficient to perform the receiver calculations in real time, using a 1st generation console format (two dedicated to Y calculations, two dedicated to P calculations, and two dedicated to Q calculations).

The broadcast station must perform about ten times more calculations per second than the receiving console, therefore in the preferred embodiment it uses parallel supercomputer processing.

Figure 6:
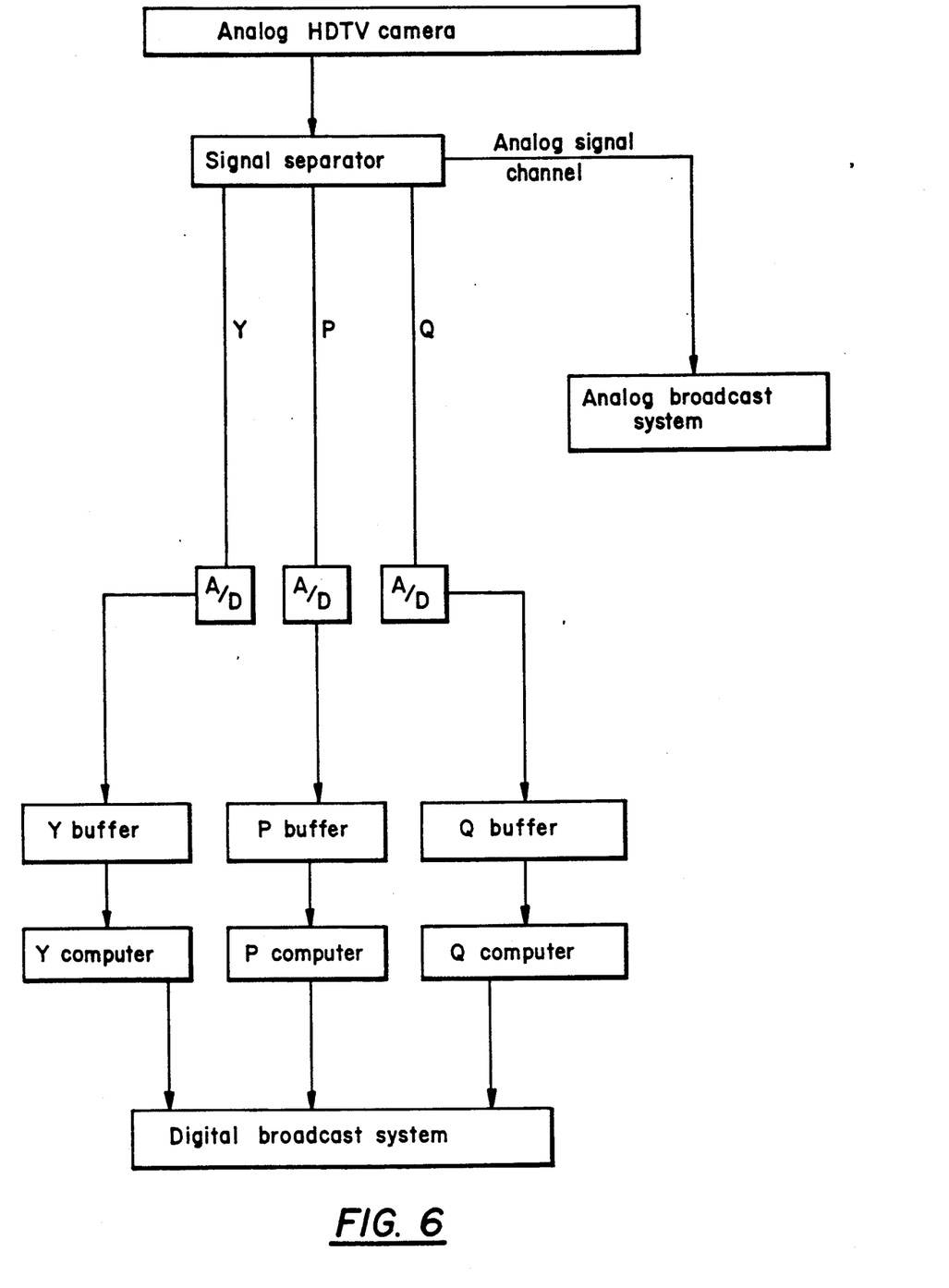
FIG. 6: Receiving system components.

The broadcast station converts the signals from analog to digital format, determines how many pixels require an updated representation, and their indices. Then it computes the coefficients defining the new representation (see FIG. 4). The broadcast station block diagram is presented in FIG. 6. The number of pixels to be updated varies from one frame to another. To keep the data rate fluctuations within channel bounds and to allow the large amount of data required to construct the starting image to be transmitted over an extended period of time, the receiver uses memory buffers such as 500. This procedure might result in a 2-3 seconds display delay, but this is of no consequence.

The information is tagged by frame and pixel and includes the following data for each frame: frame number, $m_b$, $n_b$, (the row and column indices of the first pixel requiring an update), its new color function(s) coefficients, the row and column indices of the second pixel requiring an update and so on.

While 1st generation HDTV receivers would have 1200 columns by 1200 rows, the allotted broadcast channels should be designed to allow the number of rows and columns to expand, as technology improves, up to a limit assuring a picture quality rivaling the best achieved in modern day photography, i.e., 4800 rows and 4800 columns.

An example follows to clarify the procedure:

Assume the measured luminance values are taken from table 2, and they depict the luminance changes of a pixel located on a moving object:

$$\Delta 1 = 8000$$

$$\Delta 2 = 450$$

$$\Delta 3 = 10$$

$$a = 32$$

$$b = 2$$

$$c = 0$$

$$\Delta = 250$$

Therefore the luminance function is $$h(df) = 32 + 2(df) + 0(df)^2$$

TABLE 2

| Frame # | df | Y (%) measured | Y (%) calculated | error (%) |
|---|---|---|---|---|
| 1002 | 0 | 32 | 32 | 0 |
| 1003 | 1 | 34 | 34 | 0 |
| 1004 | 2 | 36 | 36 | 0 |
| 1005 | 3 | 37 | 38 | 1 |
| 1006 | 4 | 41 | 40 | 1 |
| 1007 | 5 | 42 | 42 | 0 |
| 1008 | 6 | 45 | 44 | 1 |
| 1009 | 7 | 47 | 46 | 1 |
| 1010 | 8 | 50 | 48 | 2 |
| 1011 | 9 | 53 | 50 | 3 |
| 1012 | 10 | 54 | 52 | 2 |
| 1013 | 11 | 56 | 54 | 2 |
| 1014 | 12 | 58 | 56 | 2 |
| 1015 | 13 | 17 | 58 | 41 |

The luminance values calculated using this function satisfy the accuracy criteria up to and including frame #1014. 13 frames can be served by this function, transmitting only three numbers instead of 13 as would be required by the current state of the art. In this example, the amount of information required per frame was reduced by more than four times, therefore even preserving the current bandwidth the number of pixels can be increased four times or more! And this was a conservative example since moving objects cover only a fraction of the total picture.

The second embodiment will now be described. The differences between the second and the first embodiment derive solely from the different color function chosen. For this embodiment a linear function is used.

$$h(df) = a + b(df)$$

The notation used is similar to the 1st embodiment.

The broadcast station analyzer determines the a and b coefficients by solving the system $$a = i$$

$$a + 5b = i'$$

$$\Delta = 5$$

$$\Delta 1 = 5i$$

$$\Delta 2 = i' - i$$

$$a = \Delta 1 / \Delta$$

$$b = \Delta 2 / \Delta$$

In this embodiment, the number of calculations to be performed by the receiver computer is about 500 million, if no intermediate frames are to be calculated, and $(M+1) * 500$ million if M intermediate frames are to be used. Three Intel RISC i869XP or equivalent microprocessors would be sufficient to perform the receiver calculations in real time.

The individual pixel data packet contains: k, l, j, a, b, and if more than one color requires an update (j', a', b') and possibly (j", a", b").

In rest, the 2nd embodiment is identical with the 1st.

The third embodiment will now be described. The differences between the 3rd embodiment and the first derive from the different type of color functions chosen and from using real numbers instead of integers. The functions used are based on the Chebyshev approximation. The Chebyshev polynomials can be expressed as:

$$T_s(x) = \cos(s \arccos x)$$

Any function f(x) can be expressed as a sum of such polynomials, if $-1 < x < 1$:

$$g(x) = \sum_{s=1}^{N} c_s T_{s-1}(x) - 0.5c_1$$

For large values of N, the above expression is almost exact. To reduce the number of calculations required, the following approximate form can be used:

$$g(x) = \sum_{s=1}^{N1} c_s T_{s-1}(x) - 0.5c_1$$

where, $$N1 << N$$

The error due to this approximation is less than:

$$\sum_{s=N1}^{N} abs(c_s)$$

The coefficients $c_s$ are determined using:

$$c_s = \frac{2}{N} \sum_{q=1}^{N} g(x_q) T_{s-1}(x_q)$$

-continued or $$c_s = \frac{2}{N} \sum_{q=1}^{N} g\{\cos[\Pi^*(q - 0.5)/N]\}^*\cos[\Pi^*(s - 1)^*(q - 0.5)/N]$$

where $x = t_r$ is the relative time and $-1 < x < 1$ N1 can be chosen 8

N = 60—for the current number of frames per second

In order to improve the picture quality, a threshold value of 0.5% is used.

The T values can be tabulated to reduce the number of calculations required.

The receiver has to perform about N1/3 billion operations per second if no intermediate frames are used, and about (M+1) times more if M intermediate frames are used. These are floating point calculations. Therefore the number of Intel RISC i860XP or equivalent microprocessors required is about 3*N1.

The broadcast station computer has to perform approximately 10 times more calculations.

The invention recommends N1>6 to exploit the ability of the Chebyshev representation to model discontinuous functions.

This representation allows to use the same color function set even if the pixel color changes completely! The number of color function updates required and the data rate can decrease significantly.

The data packet required to update an individual pixel color would consist of the pixel row and column indices and the $c_s$ coefficient set.

In rest the 3rd embodiment is identical with the first.

The 4th embodiment will now be described. This embodiment uses Fourier series to model the color functions $$g(t_f) = \sum_{s=0}^{15} \{A_s \cos[\Pi^*q^*s/64] + B_s \sin[\Pi^*q^*s/64]\}$$

the A and B coefficients are calculated using $$A_s = \frac{1}{64} \sum_{q=0}^{127} i(t_{f+q}) \cos[\Pi^*q^*s/64]$$

$$B_s = \frac{1}{64} \sum_{q=0}^{127} i(t_{f+q}) \sin[\Pi^*q^*s/64]$$

To reduce the number of calculations the cosine and the sinus values should be tabulated and, the implementation of the Fourier expansion should be based on the Fast Fourier Transform (FFT) technique.

Real numbers are used to increase picture accuracy.
The threshold value is set at 0.5%
The receiver would perform about 2.5 billion floating point calculations per second if no intermediate frames are used, and (M+1) * 2.5 billion if M intermediate frames are used. If no intermediate frames are used, the number of Intel RISC i860XP or equivalent microprocessors required is about 25.

The data packet required to update an individual pixel color would consist of the pixel row index, the column index, the $A_s$ coefficients and the $B_s$ coefficients.

In rest, the 4th embodiment is identic with the 1st.

Although, the present invention is not limited to any one TV standard and can be applied in combination with any data encoding scheme including, but not limited to PAL, SECAM or any cable-based system.

What is claimed is:

1. A method for transmitting high definition television signals representing a plurality of pixels in a plurality of frames of television information, said plurality of frames occurring at different times, comprising:

analyzing one separate pixel of said television information over a period of frames and over a plurality of time, to determine characteristics of said one seperate pixel, and evolution of its characteristics, over said period of time;

analyzing others of said pixels to determine characteristics of said other pixels, and evolution of their characteristics, over said period of time;

creating a plurality of separate files, each representing one of said analyzed pixels over said period of time;

fitting characteristics of each said file representing a pixel, with a predetermined function of time using a curve fitting technique;

determining a set of numbers required to completely define said each file for a period of time longer than one frame, said numbers being of a type that values of the function of time can be computed based solely on said set of defining numbers;

transmitting a signal indicative of a first function, and for a first picture frame, transmitting the set of defining numbers;

conducting an accuracy test for following frames, in which accuracy of each pixel produced by said set of defining numbers is tested against actual color signal values, and calculating new sets of said defining numbers for pixels whose accuracy is less than a predetermined amount, and transmitting new sets of said defining numbers for those pixels that fail the accuracy test.

2. Method as in claim 1 wherein said predetermined function is a curve fitting function.

3. System as in claim 1 wherein said predetermined function is a Chebyshev representation.

4. A system as in claim 2 wherein said curve fitting function is a parabolic function.

5. A method as in claim 1 wherein said function is a linear function.

6. A method as in claim 1 wherein said function is a Fourier representation.

7. A high definition television transmitting apparatus representing a plurality of pixels which represent frames of television information, comprising:

means for receiving a source of high definition television signals;

means for analyzing a single pixel of said television information over a period of time, to determine characteristics over said period of time, and for analyzing others of said pixels over a period of time, to determine characteristics over said period of time;

creating a separate file for each of said pixels;

a memory buffer, storing values of pixels for a plurality of frames from a past time as a series of mathematical equations which define values of said pixels as said values evolve over a predetermined time;

means for calculating calculated values of said pixels from said mathematical equations, and for comparing pixels from said source, with said calculated pixels, and determining those pixels which differ by a predetermined range; and means for calculating new calculated values for those pixels which are outside said predetermined range.

8. A system as in claim 7 further comprising means for transmitting only data for those pixels which have an error greater than a predetermined amount.

9. High definition receiving system representing a plurality of pixels which represent frames of television information, comprising:

a memory which stores an equation of a basic form, and which stores a plurality of values indicative of coefficients of said equations, one group of coefficients representing a time progression of each pixel of a high definition television screen over a plurality of frames;

calculating means for calculating a value of each said pixel over said plurality of frames from said stored values indicative of coefficients and said stored equations; and a receiver structure receiving a television signal which includes instructions to update ones of said values indicative of coefficients for particular one of said pixels and to update a television picture represented thereby.

* * * * *